Aug. 9, 1932.                    A. ALESEN                    1,870,979
                          LAWN MOWER ATTACHMENT
                            Filed Jan. 12, 1932
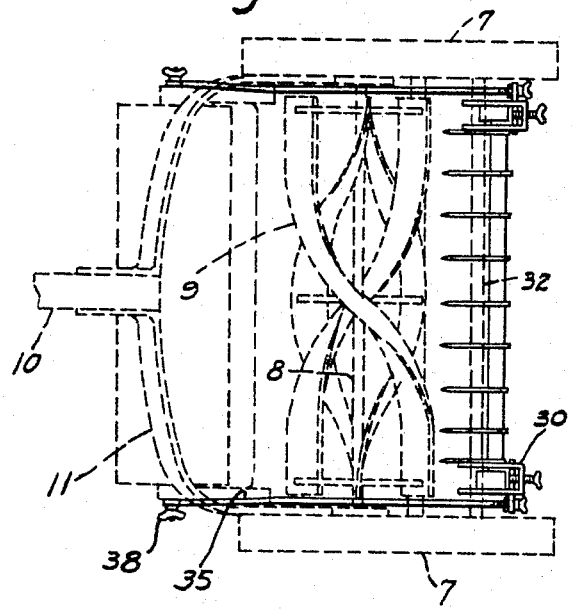
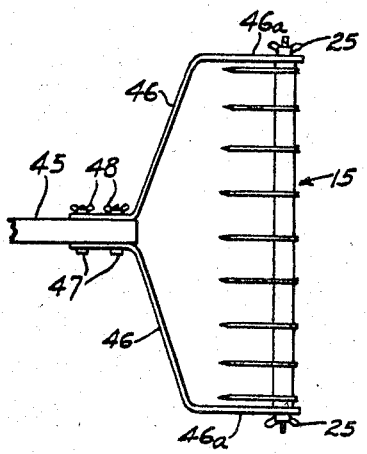
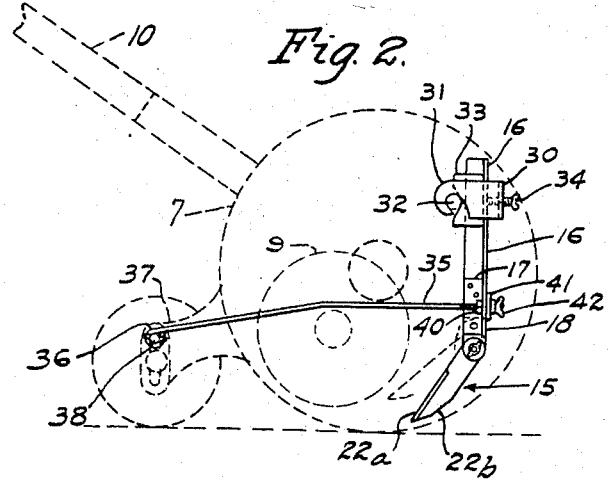
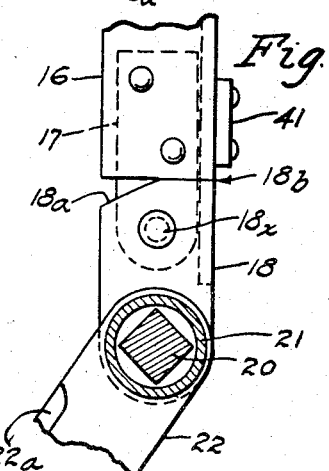
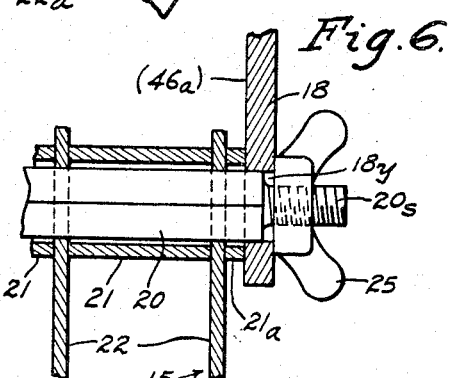
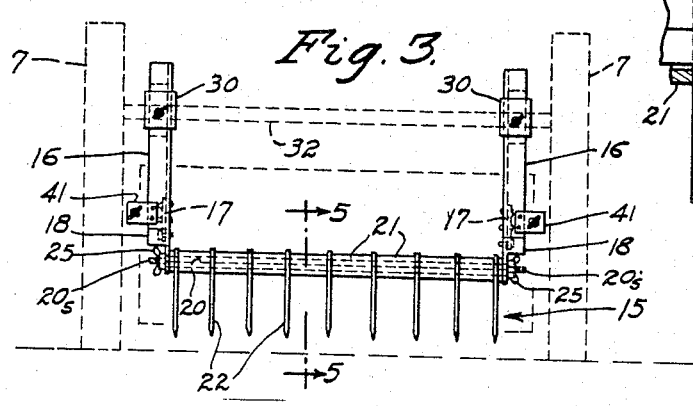
INVENTOR.
Andrew Alesen
BY Robt. D. Pearson
ATTORNEYS.

Patented Aug. 9, 1932

1,870,979

UNITED STATES PATENT OFFICE

ANDREW ALESEN, OF WEST HOLLYWOOD, CALIFORNIA

LAWN MOWER ATTACHMENT

Application filed January 12, 1932. Serial No. 586,153.

This invention relates to a lawn mower attachment which is adapted to be detachably secured to a lawn mower for the purpose of breaking such grasses loose from the soil and raising them up into a position wherein they may be cut off by means of the cutting blade of the mower.

An object of the invention is to provide a device of the character stated which will lessen the labor of ridding lawns of Bermuda and other objectionable creeping grasses which tend to choke the growth of more desirable lawn grasses.

Another object of the invention is to simplify the equipment which it has heretofore been deemed necessary to use in destroying the injurious kind of grasses, this invention providing for equipping the lawn mower with an attachment which enables the mower to be used not only as a grass cutting tool but also as a means for breaking loose the creeping grasses so that as the mower is propelled in one direction the creeping grasses are lifted from the ground and as it is propelled in the reverse direction such grasses are cut off and deposited in the grass catcher.

A still further object of the invention is to provide means for ridding lawns from injurious grasses, which can be operated not only as an attachment to a lawn mower, but which may also be provided with a handle portion and thereby operated independently of the mower.

The lawn mower attachment provided by this invention is capable of being conveniently attached to and detached from the spiral blade type of lawn mowers now in general use, without in any way altering the general construction of such mowers.

Other objects, advantages and features of the invention may hereinafter appear.

Referring to the accompanying drawing which illustrates what is at present deemed to be a preferred embodiment of the invention, Fig. 1 is a plan view of a lawn mower showing the same equipped with the attachment provided by this invention, the outline of the mower proper being indicated by broken lines and the new parts provided by this invention being shown in full lines.

Fig. 2 is an end elevation of the structure shown in Fig. 1, broken lines and full lines being used in the same manner as in said Fig. 1.

Fig. 3 is a front view of the structure shown in Fig. 1 and 2.

Fig. 4 is a plan view of the device showing the same attached to a handle for operation independently of the lawn mower.

Fig. 5 is an enlarged cross section on line 5—5 of Fig. 3.

Fig. 6 is an enlarged sectional detail illustrative of the construction of the end portion of the toothed member showing its relation to the mounting means therefor, whether the hanger of such means be of the type shown in the first three views or of the type shown in Fig. 4.

Referring in detail to the drawing, the lawn mower shown is of the well known spiral blade type being provided with the ground wheels 7, cross bar 8, spiral cutting blades 9 and handle 10 which is secured to the device by means of the yoke elements or arms 11. The rake or harrow element 15 which is provided by the invention for attachment to the lawn mower proper, is supported by two hanger elements 16, one located at each side of the mower. Each of these hanger elements 16 consists of a short bar formed in two sections which are united by a hinge portion 17, the lower or foot portion 18 of each hanger below its hinge 17 having secured to its lower end a rod 20 upon which is mounted the sleeves 21, said sleeves spacing apart the fingers or teeth 22 which are adapted to uproot or tear loose low-lying grasses. As well shown in Fig. 2, the toothed element 15 swings together with the foot portions 18 to and from the full line positions, said toothed element being, however, at all times inclined toward the rear or handle side of the mower. In the dotted line position said toothed element clears the ground sufficiently to prevent it from opposing the forward movement of the mower, but in the full line position it engages the soil a sufficient depth to tear loose the lowlying grasses when the mower is propelled rearwardly. The rear edge of each of the teeth 22 is sharpened at 22a and the other side of the tooth is bevelled at 22b in order to produce a pointed tooth of the proper character to operate effectively in the manner above stated.

Referring more in detail to the construction of the toothed member 15, the rod 20 is shown squared in cross section and each of the teeth 22 is provided with a square opening in its upper end whereby it is fitted upon said square rod. The teeth 22 are mounted in properly spaced relation to each other by the spacing sleeves 21 which encircle the rod 20 and are closely fitted between the teeth 22. Each end of said rod 20 is provided with a reduced extension or stud 20s which projects beyond the foot portion 18 of the hanger at that side of the device. Outside of each hanger a clamping nut 25 is screwed upon the stud thus tightly clamping the intervening parts in place. During the operation the entire toothed element 15 together with the foot portions 18 of the hangers swings as a unit from the dotted line positions to the full line positions of Fig. 2 and vice-versa.

The upper or body portion 16 of each hanger has secured thereto a clamp 30 consisting of a yoke having hooked portions 31 which are directed downwardly over the cross bar 32. Said clamp is provided with a block or saddle portion 33 and with a clamping screw 34, the operation of said screw causing the bar 32 to be firmly clamped between said saddle and the hooks 31.

The hanger 16 together with its foot portion 18 is preferably formed of angle iron while the inner end of the clamping screw 34 abuts against the outer face of one of the flanges of said angle iron, while the saddle or block 33 abuts against the opposite face of said flange. The other flange of the angle iron keeps the block 33 from moving in one lateral direction while the opposite arm of the yoke 30 prevents displacement of said block in the opposite direction.

The clamping device which has been described is vertically adjustable upon the hanger 16 and it is only necessary to loosen the screw 34 to prepare the device for adjustment to vary the extent to which the teeth 22 will enter the soil. As shown in detail in Fig. 6 the foot portion 18 of the hanger is pivotally mounted at 18x and is cut away at 18a to permit the swinging movements of the teeth 22, while at the other side of the pivot there is provided as indicated at 18b, cooperating shoulders which limit the forward or downward swing of the teeth 22.

In order to provide additional means for bracing or stabilizing the hangers 16, there is secured to the lower part or body portion of each of said hangers, the front end portion of a brace rod 35 while the rear end of said brace rod is provided with a hook or eye 36 whereby it is clamped to the mower extension 37 by means of a thumb nut or like device 38. The means for attaching the front end of said brace rod to the hanger 16 may consist of an inner nut 40 on one side of the hanger, the hanger being at this point apertured to permit the brace rod to extend therethrough with said nut abutting against the hanger as shown. Upon the projecting portion of said brace rod is desirably placed extension element 41 and the thumb nut 42 is screwed onto the projecting end of said brace rod and against said element to clamp the adjacent parts rigidly in place. By screwing the nuts 40 and 42 a greater or less distance from the front end of the brace rod 35 the distance between the cutters 9 and the foot portion 18 of the hanger may be regulated as desired. It is desirable to adjust the toothed member 15 as near to the cutters as possible without danger of interference with them.

In order to adapt the implement for use as a hand tool independently of the mower, a handle member 45 is provided therefor, said handle having cooperating arms 46 secured to the end thereof in any suitable manner as by means of the bolts 47 and thumb nuts 48. Each of said arms 46 is provided with a body portion which diverges outwardly from the other and with parallel forwardly directed end portions 46a, said portions 46a being apertured and spaced from each other the proper distance to receive between them the toothed member 15. Therefore, by removing the clamping nuts 25 the toothed member 15 may be removed from its mounting as shown in Figs. 2 and 3 and then the supporting rod 20 together with the teeth and sleeves mounted thereon may be inserted between the arm portions 46a shown in Fig. 4, whereupon the clamping nuts may be screwed back into place with sufficient tightness to clamp the device securely in position to be operated by hand, as indicated in Fig. 6.

Describing more in detail the mounting means for the toothed member, as shown in Fig. 6, each end portion of the supporting rod 20 is square in cross section to a point which is flush with the outer surface of the hanger foot 18 (or arm portion 46a, if the toothed member is supported by the means shown in Fig. 4). The hanger foot 18, and also the arm portions 46a of Fig. 4, are in either case provided with a square aperture 18y into which the adjacent end portion of the rod 20 is fitted. The reduced end portion 20s at each end of the rod 20 projects far enough to receive the thumb nut 25 so that when the thumb nut at each end of the rod is screwed down tightly in place there can be no accidental displacement of parts. In addition to the parts which have just been recited, a washer element or very short sleeve 21a is placed over the rod 20 outside the end tooth in order to space said tooth away from the hanger element 18 or arm 46a when the toothed element is mounted in its operative position whether to be operated as a part of the mower or to be used as an independent hand implement.

In operating a lawn mower which has been equipped with the attachment, during the forward propulsion of the mower, the teeth of the member 15 will brush lightly across the surface of the lawn without interfering with the usual operation of the mower. But if it is desired to use the mower for the purpose of lifting up and cutting off the creeping grasses, then the mower will be moved back and forth upon the lawn, the toothed member 15 elevating the grasses when the mower is moved backwardly in order that when the mower is moved forwardly over the same area the cutting blades may cut off the grasses which have been lifted above the surface of the lawn by the toothed member. This operation is rendered more effective by reason of the cutting edges 22a of the teeth severing the creeping grasses so that their upwardly projecting ends may readily be cut off by the cutter 9 of the mower and deposited in the grass catcher.

I claim:

1. A lawn mower attachment comprising a rake element having a plurality of teeth projecting therefrom, and hanger means to attach said rake element to a lawn mower in advance of the cutting blades thereof, said hanger elements being provided with hinge elements to permit said teeth to swing clear of the soil when the mower is advanced and causing said teeth to swing into a digging position when the mower is propelled rearwardly.

2. An attachment for lawn mowers comprising a hanger element having a body portion and a foot portion pivoted to said body portion, means to secure the body portion of said hanger element to a lawn mower in an upstanding position forwardly of the cutting blades of the mower, bracing means secured to said body portion in spaced relation to said securing means, said bracing means also being secured to the frame of the mower, and a toothed member secured to said foot portion in position to operatively engage the soil when the mower is propelled in one direction and to swing out of operative position with relation to the soil when the mower is propelled in the reverse direction.

3. An attachment for lawn mowers comprising, in combination with the mower frame, a hanger bar having a body portion and a foot portion pivoted to said body portion, a clamp to secure said body portion to one of the cross bars of the mower frame, bracing means secured to the mower frame and secured to said bar in spaced relation to said clamp, and a toothed implement secured to said foot portion of said hanger bar, said implement being adapted to engage and lift creeping grasses from the soil.

4. An attachment for lawn mowers comprising, in combination with the mower frame, a hanger bar having a body portion and a foot portion pivoted to said body portion, a clamp to secure said body portion to one of the cross bars of the mower frame, a brace rod having one end portion secured to the body portion of said hanger bar in spaced relation to said clamp, the other end portion of said brace rod being secured to the mower frame, said brace rod extending forwardly and rearwardly with relation to the mower frame, and a toothed implement secured to said foot portion of said hanger bar, said implement being adapted to engage and lift creeping grasses from the soil.

5. An attachment for lawn mowers comprising a set of hangers, means to secure said hangers in upstanding spaced relation to each other upon the frame of the mower, a toothed member adapted for securing between said hangers in position to engage the soil for the purpose of breaking loose and lifting low-lying grasses, a handle member having arms with end portions spaced apart from each other to correspond to the spacing of said hangers from each other, and means to detachably secure said toothed member in operative position either between said hangers or between said arms.

6. The combination, with a lawn mower frame, of upstanding hangers attached to said frame in advance of the cutting blades of the mower, said hangers having foot portions pivoted to them; and a toothed member adapted to lift low-lying grasses from the soil, said toothed member consisting of a rod having a body portion fitting between said hangers and reduced end portions adapted to project beyond said hangers, said teeth being non-rotatably fitted upon said rod, spacing sleeves upon said rod to maintain said teeth in spaced relation to each other, and nuts screwing on to the reduced end portions of said rod outside of said foot portions of the hangers in order to clamp said toothed members in fixed relation to the foot portions of the hangers to swing therewith.

7. The combination, with a lawn mower frame having a cross bar extending thereacross, of a hanger member comprising a clamping device whereby said member is detachably secured to said cross bar, and a toothed member pivotally secured to said hanger member in position to swing into an operative position to lift low-lying grasses when the mower is propelled in one direction and to swing to an inoperative position when the mower is propelled in the reverse direction.

8. The combination, with a lawn mower frame having a cross bar extending thereacross at a higher level than the axis of the ground wheels, of a hanger member comprising a clamping device whereby said member is detachably secured to said cross bar, a forwardly and rearwardly extending brace bar which is connected to said hanger below said cross bar and is anchored to said frame to stabilize said hanger member, and a toothed member pivotally secured to said hanger member in position to swing into an operative position to lift low-lying grasses when the mower is propelled in one direction and to swing to an inoperative position when the mower is propelled in the reverse direction.

9. An attachment for lawn mowers comprising a set of hangers, means to secure said hangers in upstanding spaced relation to each other upon the frame of the mower, a toothed member adapted for securing between said hangers in position to engage the soil for the purpose of breaking loose and lifting low-lying grasses, and means to secure said toothed member to said hangers, said securing means comprising a rod to which said teeth are fixed, said rod having square end portions and screw threaded portions projecting beyond said end portions said hangers having square apertures to receive said square end portions, and clamping means to screw on to the screw threaded portion of said rod.

10. An attachment for lawn mowers comprising a set of hangers, means to secure said hangers in upstanding spaced relation to each other upon the frame of the mower, a toothed member adapted for securing between said hangers in position to engage the soil for the purpose of breaking loose and lifting low-lying grasses, a handle member having arms with portions spaced apart from each other to correspond to the spacing of said hangers from each other, and means to detachably secure said toothed member in operative position either between said hangers or between said arms, said securing means comprising a rod to which said teeth are fixed, said rod having square end portions and screw threaded portions projecting beyond said end portions, said hangers having square apertures to receive said square end portions, and said arms also having square apertures to receive between them the square end portions of said rod, and clamping means to screw on to the screw threaded end portions of said rod.

In testimony whereof, I hereunto affix my signature.

ANDREW ALESEN.